United States Patent [19]

Wegerhoff et al.

[11] 4,172,735
[45] Oct. 30, 1979

[54] FILLED FOAMS OF REGENERATED CELLULOSE AND PROCESS FOR THE MANUFACTURING OF SAID FOAMS

[75] Inventors: Arno Wegerhoff, Worth, Fed. Rep. of Germany; Dieter Frank, Naperville, Ill.

[73] Assignee: Akzona Incorporated, Asheville, N.C.

[21] Appl. No.: 815,479

[22] Filed: Jul. 13, 1977

[30] Foreign Application Priority Data

Jul. 13, 1976 [DE] Fed. Rep. of Germany ....... 2631415

[51] Int. Cl.$^2$ .............................................. C04B 43/10
[52] U.S. Cl. ................................. 106/18.12; 106/122; 106/164; 106/168; 252/62; 264/45.3
[58] Field of Search ........... 106/122, 164, 168, 15 FP; 252/62; 264/45.3

[56] References Cited

U.S. PATENT DOCUMENTS

| | | | |
|---|---|---|---|
| 2,029,311 | 2/1936 | Elias | 106/122 |
| 2,077,412 | 4/1937 | Herzog et al. | 106/122 |
| 2,125,286 | 8/1938 | Fletcher | 106/15 FP |
| 2,756,159 | 7/1956 | Kendall et al. | 106/15 FP |

*Primary Examiner*—Lorenzo B. Hayes
*Attorney, Agent, or Firm*—Francis W. Young; Jack H. Hall

[57] ABSTRACT

Flame resistant foam plastics of cellulose and kieselguhr or one of several types of mica such as roscoelite, lepidolite, biotite, phlogopite, vermiculite or muscovite where at least 80 percent by weight of the kieselguhr or the mica show grain sizes ranging from 0.4 to 650 microns and where the bulk density of the kieselguhr is less than 0.40 g./cc. and the bulk density of the mica is less than 0.37 g./cc.

9 Claims, No Drawings

FILLED FOAMS OF REGENERATED CELLULOSE AND PROCESS FOR THE MANUFACTURING OF SAID FOAMS

BACKGROUND OF THE INVENTION

A great number of foams of polystyrene, polyvinyl chloride, polyethylene, ureaformaldehyde resins, phenol resins, polyurethane, silicones, epoxy resins and other synthetic polymers are known. The properties of these products are essentially determined by the type of polymer, density, pore structure and pore size as well as by the type of incorporated fillers or reinforcing materials. By judicious selection of suitable polymers, foaming agents, fillers, dispersing agents, foam stabilizers, etc. as well as of the conditions for the foaming process, it is possible to obtain closed-pore, open-pore and mixed-pore brittle, tough, or resilient foams for various technical applications (Ullmanns Encyklopaedie der technischen Chemie, Urban and Schwarzenbach, Munich-Berlin, 3d Edition (1964), Vol. 15, p. 184 and following).

Cellulose foams are also known. According to the processes described in German Pat. Nos. 570 894 and 601 435, viscose which may or may not contain different additives, is coagulated by allowing the natural maturing process to take place or by means of acid gases. In these known processes, consideration is given to such additives as fillers, plasticizers, impregnating agents and binders. Fillers are intended in particular to enhance the strength of the foam. Examples of suitable fillers are: textile fiber, excelsior or wood fiber, pulp, animal hair, asbestos, cork pellets, cork powder, saw dust, mechanical wood pulp and inert powders. Plasticizers, for example, glycerin and glycol are added during coagulation to impart to the viscose foam a greater stability and to prevent drying out of the foam. Examples of imprenating agents are those which minimize the flammability of the cellulose, such as ammonium salts and borax and, furthermore, those which inhibit the water vapor sensitivity of the products, for example aluminum soaps, latex, phenol-formaldehyde condensation products, paraffin emulsions and tar products. Binders, which serve to bond water are: gypsum and cement.

The products derived from these known processes are, according to the patents, suitable as building materials, especially as thermal and sound insulation, as packing material and for any type of plastic products.

However, to date only pure cellulosic, open-pore and resilient, soft foams have gained any industrial importance. Fields of application are sponges and sponge wipes for household use. In other areas—e.g. in the building trade—regenerated cellulose foams have so far found no application. There are a number of reasons for this: First of all, there is the high swelling in water, which fundamentally limits application to dry situations. Another problem is that the cellulose, when processed according to the viscose process, undergoes considerable shrinkage. The result is that the foam mass during xanthate cleavage, but especially during drying, is unevenly deformed and compacted, so that until now it has not been possible to manufacture flame-resistant products having a high mineral content and exhibiting both a low density as well as a fine, uniform pore structure. In this connection, it is pointed out that due to the high processing shrinkage of the viscose, it has not been possible heretofore to produce viscose sponges, i.e. blocks of cellulose foam, on a continuous basis.

In known methods for producing viscose sponges, sodium sulfate crystals are introduced into the viscose mass. A pore structure is obtained after coagulation and xanthate separation when the sodium sulfate is removed by dissolving and washing. The strength of the sponges can also be increased by the incorporation of additional cellulose fibers. Viscose sponges contain large cavities as well as regions with smaller pores. However, a structure of this type is unsuitable for some uses such as thermal insulation, because heat transfer is too high due to air convection. Moreover, because of the time required for dissolving and washing, the viscose sponge process does not appear suitable for the production of industrial cellulose foams. Much more favorable are methods such as the well known foam whipping process or modern techniques such as, for example, foaming by evaporation of emulsified blowing agent additives. However, these methods cannot be used where fiber is to be added since an uneven pore structure is produced due to larger bubbles or pores being formed on the fibers than in the areas between fibers.

From the above discussion, it is readily seen that asbestos, a filler used for cellulose foams in the form of long fibers, presents drawbacks when added to the viscose from which regenerated cellulose products are made. Another drawback of asbestos is that the manufacturing of shaped foams, such as fibers or chips, is limited, since viscose mixed with long asbestos fibers cannot be extruded through narrow spinnerets. Furthermore, it would be desirable to produce water resistant foam moldings by mixing chips with a suitable binder, e.g. one based on phenolic resin, whereby the binder causes the entire system to become hydrophobic.

While the use of asbestos of microfibrous structure, such as the commercially available Asbestine, would eliminate the above drawbacks, shrinkage of viscose during the processing, deformation during drying, and an increase in density are objectional properties resulting from the incorporation of Asbestine. Moreover, it is known that breathing asbestos dust will cause lung cancer (J. C. Gilsin, Composites, March 1972, page 57).

Other known mineral fillers for cellulose foams are cement and gypsum (German Pat. No. 601 435; German Pat. No. 570 894). With cement and gypsum the processing shrinkage of viscose is too high (see control example), creating the same drawbacks as Asbestine.

Now, as in the past, cellulose is available as raw material inexpensively and in large quantities. Cellulose offers a suitable basis for the manufacture of flame-resistant industrial products, because it does not melt on burning and thus does not propagate flames as do thermoplastic materials. The objective was therefore to utilize this raw material for serviceable industrial foams.

BRIEF SUMMARY OF THE INVENTION

The objective of the invention is a process to manufacture flame-resistant foams using regenerated cellulose and an inorganic filler by foaming and, under certain conditions, simultaneously molding a mixture of viscose, blowing agent, dispersing agent and mineral filler and subsequent coagulation of the foamed mass, characterized in that the filler is kieselguhr or one or more of the micas: roscoelite, lepidolite, biotite, phlogopite, vermiculite, or muscovite, provided that at least 80 wt. % of the kieselguhr or the mica has a particle size between 0.4 to 650 microns, the bulk density of the kieselguhr is less than 0.40 g./cc., and the bulk density of the mica is less than 0.37 g./cc.

It has unexpectedly been found that the above mentioned fillers considerably minimize the processing shrinkage of the viscose, especially the drying shrinkage. It is thus possible to obtain the foams as blocks, without deformation of the mass during drying and without undesirable compacting or formation of cracks. This effect, which alone makes possible an economical production of lightweight foams from inorganic materials and cellulose is not provided either by the well-known cellulose foam fillers: asbestos, cement and gypsum, or by other fillers such as talcum, kaolin, chalk, feldspar-like inorganic substances, aluminum oxide or calcium silicate frequently used by the chemical industry.

DETAILED DESCRIPTION OF THE INVENTION

Among mineral fillers, mica and kieselguhr, because of their interaction with cellulose xanthate or cellulose, occupy a special position. This can be explained by assuming the presence of electrostatic forces between the inorganic substance and the functional groups of the polymer molecule.

One of the fillers to be used according to the invention is kieselguhr, also known as diatomite or diatomaceous earth. This includes both the inexpensive roasted types, and the high quality products obtained by calcination, activation and air sifting (cf. Ullmanns Encyklopaedie der technischen Chemie, l.c. Vol. 15, pp. 727–732).

Micas, such native micas as roscoelite (vanadium mica), lepidolite (lithia mica), biotite (brown magnesite mica), phlogopite (magnesiumoxide mica), vermiculite (decomposition products of biotite, phlogopite and similar minerals with a high water content), as well as muscovite (potassium mica) may be used as the filler. These minerals are also used in commercial form, e.g. dry-ground or wet-ground (cf. Ullmanns Encyklopaedie der technischen Chemie, l.c. Vol. 8, pp. 183–190). Wet-ground muscovite is the preferred filler because of its favorable particle size distribution.

The fillers according to the invention should be selected so that at least 80 wt. % thereof has a particle size ranging from 0.4 to 650 microns. Preferably at least 80 wt. % of the kieselguhr has a particle size ranging from 0.4 to 200 microns and at least 80 wt. % of the mica a particle size ranging from 0.4 to 100 microns. It has been found that very finely or very coarsely ground fillers are not suitable for use according to the invention.

An important characteristic of the fillers is their bulk density. In the case of kieselguhr it would be less than 0.40 g./cc., preferably less than 0.28 g./cc. and in the case of mica less than 0.37 g./cc., preferably less than 0.30 g./cc.

The cellulose foams according to the invention can be manufactured by known processes from practically any viscose that can be used in making various rayon types. Moreover, viscoses used for the manufacture of staple fiber or supercord are suitable as well. Even viscoses containing modifying agents and pigments can be used. For the manufacture and composition of the viscose, reference is made to K. Goetze, Chemiefasern nach dem Viskoseverfahren, Springer-Verlag, Berlin/Heidelberg/New York, 3rd edition (1967), pages 282–625.

The purpose of the dispersing agent is to insure uniform dispersion of filler and blowing agent in the viscose. Suitable compounds for this are anion-active and nonionogenic emulsifiers conventionally used in the art, e.g. carboxylates, alkylsulfonates and sulfates, alkylphenol polyglycolethers and oxythylated polypropylene glycols. Emulsifiers such as nonylphenol-polyglycolether, and oleylalcohol (5 ethylene oxide (EO)) have been found especially suitable.

To prepare the foam according to the invention, viscose, dispersing agent and filler are first intimately mixed. The mixing ratio of viscose to filler is calculated so that the proportion of cellulose to filler ranges between 90/10 to 10/90, preferably between 50/50 to 15/85 parts by weight. The required quantity of dispersing agent depends upon its composition and upon the quantity of filler, as a rule 0.2 to 3% by weight based on viscose/filler mass is required. The viscose foam can be obtained in various ways according to known processes. It is, for instance, possible to add to the viscose/filler mix suitable foaming agents such as protein, soaps, fatty acid esters, saponine, dextrine, latices and the like and to foam the mass in a conventional foaming apparatus by means of compressed air or by beating air into it. It is, furthermore, possible to foam the viscose/filler mix by means of a blowing agent. Suitable for this are vapors of low boiling liquids, especially the lower alkanes, e.g. butane, isobutane and pentane. Other suitable physical blowing agents are noncombustible hydrocarbon halides, such as methylene chloride or trichlorofluoromethane. Solid blowing agents can also be added to the viscose/filler mass, which blowing agents decompose to a blowing gas during coagulation. Reference is made here e.g. to alkalicarbonates and alkalibicarbonates, as well as metals, e.g. aluminum powder. In the case of carbonates and bicarbonates, the blowing agent is carbon dioxide, in the case of metals, the blowing agent is hydrogen.

The viscose/filler foam is subsequently set in a known manner by regeneration of the cellulose. There are a number of processes which can be used for this. For instance, the viscose/filler foam can be coagulated by means of spinbath solutions conventionally used in the production of rayon. In addition to an inorganic acid, these solutions may also contain sodium sulfate, zinc sulfate and/or magnesium sulfate. Solutions with a low acid content or ammonium chloride solutions can be used for foams containing relatively little viscose. Coagulation and xanthate separation can also be performed by means of acid gases or without using a precipitant, by allowing the natural maturing process to take place. In the latter case it has been found advantageous to accelerate the process by the addition of esters, which hydrolyze at room temperature in the alkaline medium of the viscose. Suitable are e.g. esters of p-toluene sulfonic acid, of phosphoric acid and of carbonic acid. Use is preferably made of diethyl carbonate.

Molding of the foam is accomplished in conventional manner during or, better, prior to coagulation. To manufacture large foam structures, e.g., sheets, blocks, etc. coagulation of the foam is accomplished in a mold. It is also possible to extrude the dispersion through spinnerets located in a precipitation bath, resulting in foam strands having a cross-section corresponding to that of the selected spinnerets, which strands can be cut to optional lengths.

The foams according to the invention, being inorganic-organic plastics, are far superior to known cellulose foams. As is known, flame-retardant characteristics depend essentially on the inorganic substance content of the total mass. The fillers according to the invention can be incorporated in the indicated amounts, without creating problems in processing to sheets or blocks, whereas with the known fillers; gypsum and cement because of deformation, shrinkage and cracking during drying, impeccable industrial production is not possible with the above mentioned filler/cellulose ratio.

The foams according to the invention have a bulk density two to three times lower than the corresponding gypsum cellulose foam and thus a substantially greater thermal insulating capacity. In spite of the low density of e.g. 140 kg./m.$^3$ (0.140 g./cc.) and a very high content of inorganic components, the foams according to the invention have favorable mechanical properties. Unlike purely inorganic products, such as glass foam or sodium silicate foam, these foams are not brittle. The drawback of the former foams is that when used as insulating material, combined with concrete or masonry in buildings, stresses generated in said buildings may lead to cracks in the foam structure. By contrast, with the foams according to the invention, these stresses are absorbed by the foam mass, the foam being slightly deformed but not broken.

The foams according to the invention have a bulk density ranging from 50 to 400 kg./m.$^3$. They exhibit excellent flame resistance and high volumetric stability. They can be worked and processed in virtually any manner; they can be sawed, cut, milled, shaped, die-cut, dyed, painted, glued, and coated.

The products according to the invention are used as thermal and sound insulation, as filler for synthetic polymer foams, to which they impart flame-resistant characteristics. Furthermore, they can be processed to self-supporting molded foam structures by processing the chips in a known manner together with conventional organic or inorganic binders. Examples of such organic binders are formaldehyde condensation resins, epoxy resins polyester resins and polyurethane adhesives. Examples of inorganic adhesives are sodium silicate, gypsum, cement, and calcium silicate.

The invention is illustrated by the following examples:

EXAMPLE 1

250 g. of a viscose containing 8.6% cellulose, 200 g. water, 86 g. wet-ground muscovite mica (bulk density: 0.25 g./cc. particle size distribution in wt. %; 22.3 0-10 microns; 31.4 10-20 microns; 38.8 20-40 microns; 7.5 40-80 microns) and 9 g. nonylphenol polyglycolether (9 EO) are dispersed in a pressure vessel using a heavy duty horseshoe stirrer. 13 g. n-butane is added at a pressure of 5 atm., and 20 g. diethylcarbonate is added after the pressure in the input vessel has been raised to 6 atm. The time required to emulsify the diethylcarbonate with the system was exactly 2 minutes, after which the mix was expanded by opening a cock at the bottom of the vessel and blown into a mold. After 90 minutes, the foam mass had coagulated enough to be removed from the mold and dried at 90° C. and 150 Torr. Neither deformation nor cracking was observed during drying. A finely porous foam having a bulk density of 0.140 g./cc. was obtained. The crushing strength was 2.9 kp./cm.$^2$, the thermal conductivity index: $\lambda$=0.048 kcal./m.h.°C. and the weight ratio mica/cellulose=4:1.

The burning behavior of the foam was tested according to ASTM D 1692-59 T and met the "nonflammable" standard. No dripping or melting of the material was observed in the strip test. Part of the specimens glowed after removal of the burner flame. The afterglow was eliminated by addition of 2.7 wt. % (based on viscose) of melamineformaldehyde powdered resin (Kauramin-Leim 650). The addition was made during preparation of the foam dispersion.

EXAMPLES 2–4

The foams were prepared as described in Example 1 using the following listed inorganic substances (Table 1). Neither cracks nor deformations were observed in drying these foams. All products proved to be nonflammable.

Table 1

| Example No. | Filler Type | Bulk Density g./cc. | Particle Size Distribution[1] (in microns) Mass % | | | | | Bulk density of the foam g./cc. |
|---|---|---|---|---|---|---|---|---|
| | | | 0-10 | 10-20 | 20-40 | 40-80 | 80-300 | |
| 2 | Muscovite mica "dry-ground" | 0.27 | 2.0 | 2.8 | 4.7 | 6.1 | 87.4 | 0.150 |
| 3 | Vermiculite (expanded and ground) | 0.14 | 2.7 | 3.2 | 3.0 | 3.1 | 88.0 | 0.140 |
| 4 | Kieselguhr, purified and calcined | 0.24 | 21.5 | 63.5 | 15.0 | — | — | 0.160 |

Table 2

| Example No. | Kieselguhr Type | Bulk Density g./cc. | Particle Size Distribution[2] Mass % | | | | | Bulk density of the foam g./cc. |
|---|---|---|---|---|---|---|---|---|
| | | | 0-0.6 | 0.6-2.0 | 2.0-20 | 20-200 | 200-630 | |
| 5 | No. 10 | 0.22 | — | 10(0-2.0) | 59 | 31 | — | 0.140 |
| 6 | Fina | 0.12 | 14 | 26 | 51 | ca. 9 | — | 0.125 |
| 7 | Klarfix | 0.19 | 2 | 6 | 76 | ca. 16 | — | 0.215 |
| 8 | No. 60 Quick | 0.28 | — | 3 | 30 | 48 | 19 | 0.260 |

[1]Coulter Counter determination
[2]Information provided by supplier

EXAMPLES 5-8

In Examples 5-8 economical Kieselguhr types still contaminated with FeO and AlO supplied by Gaquoin and Reuter, GmbH, Hanau, were used (Table 2). The foams were obtained in the same manner as in Example 1 and all were non-flammable.

CONTROL EXAMPLES 9-11

Instead of the muscovite mica described in Example 1, known fillers for cellulose foam such as gypsum (commercial insulating plaster), Portland cement and "American Asbestine" (a finely divided light asbestos type) were used. The following foams were obtained.

Table 3

| Control Example No. | Filler Type | Bulk Density g./cc. | Bulk density of foam g./cc. | Drying Behavior |
|---|---|---|---|---|
| 9 | Gypsum | 0.66 | 0.390 | substantial deformation |
| 10 | American Asbestine | 0.66 | 0.330 | cracking |
| 11 | Portland cement | 1.01 | (x) | deformation and cracking |

(x) The foam was so extensively deformed and cracked that bulk density determination was impossible.

The well-known cellulose foam fillers, gypsum and cement, as well as many other inorganic substances frequently used in the art such as talcum, kaolin, aluminum oxide, "silicated chalk", calcium silicate, etc. where unable to reduce substantially the processing shrinkage of the viscose. In Control Examples 12 and 13 it will be shown that the effects observed with mica and kieselguhr cannot be achieved by other fillers even within the particle size range of the fillers of the invention.

CONTROL EXAMPLES 12-13

Coarse and fine kaolin were used as the inorganic filler. The foams were prepared as described in Example 1. Foams of the following bulk densities were obtained (Table 4).

Table 4

| Control Example No. | Filler Type | Bulk Density g./cc. | Size Distribution in microns Mass % | | | | | Bulk density of foam g./cc. | Drying Behavior |
|---|---|---|---|---|---|---|---|---|---|
| | | | 0-10 | 10-20 | 20-40 | 40-80 | 80-500 | | |
| 12 | China clay | 0.33 | 98.5 | 1.5 | — | — | — | 0.325 | Deformation |
| 13 | Kaolin, coarse | 0.92 | 1.5 | 11.0 | 34.5 | 48.0 | 5.0 | 0.430 | Deformation and cracking |

EXAMPLE 14

At standard pressure, a dispersion was prepared from 1000 g. viscose (cellulose content 8.6%), 460 g. water, 200 g. wet-ground muscovite mica (see Example 1), 15 g. nonylphenol polyglycolether (9EO) and 200 g. n-pentane. The dispersion was pumped upwards at a rate of 7 l./h. through a spinneret with 43 circular holes of a diameter of 1 mm. into 30% sulphuric acid at 55° C. The resulting, coagulated strands foamed in a 1-m. zone at the surface of the sulphuric acid bath. Said strands were passed through a second water bath at 40° C. and taken up at a rate of 11 m./min. After deacidification with water, the material could be cut to fiber-shaped particles. At a staple length of 5 mm., the bulk density of dry, pourable and flame-resistant material was 0.05 g./cc.

Composition
70 wt. % muscovite mica
30 wt. % cellulose

CONTROL EXAMPLE 15

Fiber-shaped particles of 5 mm. staple length were prepared with "American Asbestine" as filler, as described in Example 14. The bulk density was 0.13 g./cc., thus substantially higher than that of the extruded product prepared in Example 14 according to the invention.

I claim:

1. Dimensionally stable flame-resistant foams of regenerated cellulose and from 10 to 90% by weight of a filler uniformly dispersed in said cellulose selected from the group consisting of kieselguhr and mica, wherein at least 80 wt. % of said filler has a grain size ranging from 0.4 to 650 microns, said kieselguhr has a bulk density of less than 0.40 g./cc. and said mica has a bulk density of less than 0.37 g./cc.

2. The flame-resistant foam of claim 1, wherein said filler is kieselguhr having a bulk density of less than 0.28 g./cc. and at least 80 wt. % of said kieselguhr has a grain size ranging from 0.4 to 200 microns.

3. The flame-resistant foam of claim 1 wherein said filler is a mica selected from the group consisting of roscoelite, lepidolite, biotite, phlogopite, vermiculite and muscovite.

4. The flame-resistant foam of claim 3 wherein at least 80% by weight of the mica has a grain size ranging from 0.4 to 100 microns and a bulk density of less than 0.30 g./cc.

5. A method for the production of dimensionally stable flame-resistant foams of regenerated cellulose and an inorganic filler by foaming and simultaneously molding a mixture composed of viscose, a blowing agent, a dispersing agent, and said inorganic filler and subsequently coagulating and drying the foamed mass, the improvement comprising using a filler selected from the group consisting of kieselguhr and mica wherein at least 80 wt. % of said filler has a grain size ranging from 0.4 to 650 microns, and wherein said kieselguhr has a bulk density of less than 0.40 g./cc. and said mica has a bulk density of less than 0.37 g./cc.

6. The process of claim 5, wherein said mica is selected from the group consisting of roscoelite, lepidolite, biotite, phlogopite, vermiculite, and muscovite.

7. The process of claim 6 wherein said filler is wet-ground muscovite.

8. The process of claim 5 wherein said filler is kieselguhr.

9. The dimensionally stable foams of claim 1 containing from about 50% to about 85% by weight of said filler.

* * * * *